United States Patent [19]
Cicchetti et al.

[11] Patent Number: 5,948,837
[45] Date of Patent: Sep. 7, 1999

[54] PROCESS FOR THE PRODUCTION OF FLAME RETARDING ADDITIVES FOR POLYMER COMPOSITIONS, AND PRODUCTS OBTAINED FROM SAID PROCESS

[75] Inventors: Osvaldo Cicchetti; Alfonso Bevilacqua; Alberto Pagliari, all of Milan, Italy

[73] Assignee: Montell North America Inc., Wilmington, Del.

[21] Appl. No.: 08/987,923

[22] Filed: Dec. 10, 1997

[51] Int. Cl.⁶ .......................... C08K 5/3492; C09K 21/12
[52] U.S. Cl. .......................... 524/100; 252/606; 252/609; 524/101; 524/102; 524/140; 524/186; 524/236; 524/253; 524/500; 525/340
[58] Field of Search .................................. 252/606, 609; 524/100, 102, 101; 525/340

[56] References Cited

U.S. PATENT DOCUMENTS

| | | | |
|---|---|---|---|
| 3,134,742 | 5/1964 | Wismer et al. | 252/609 X |
| 3,562,197 | 2/1971 | Sears et al. | 252/606 X |
| 3,885,912 | 5/1975 | Golborn et al. | 252/609 X |
| 4,010,137 | 3/1977 | Brady | 252/609 X |
| 4,193,945 | 3/1980 | Bertelli et al. | 525/2 |
| 4,201,677 | 5/1980 | Shukla et al. | 252/606 |
| 4,461,862 | 7/1984 | Eigenmann | 524/101 |
| 4,599,375 | 7/1986 | Berte et al. | 524/100 |
| 4,729,853 | 3/1988 | von Bonin | 252/609 X |
| 5,225,464 | 7/1993 | Hill, Jr. | 252/609 X |

FOREIGN PATENT DOCUMENTS 0222269  5/1985  Germany ................ 252/609

OTHER PUBLICATIONS

The Merck Index, Tenth Edition , Publ. by Merck & Co., Inc., Rahway, N.J. (1983) p. 1076.

Primary Examiner—Richard D. Lovering

[57] ABSTRACT

Flame retarding additives prepared by way of reaction of:
A) one or more nitrogenous organic compounds of a defined formula;
B) $P_2O_5$;
C) $H_2O$.

8 Claims, No Drawings

PROCESS FOR THE PRODUCTION OF FLAME RETARDING ADDITIVES FOR POLYMER COMPOSITIONS, AND PRODUCTS OBTAINED FROM SAID PROCESS

The present invention concerns a synthesis process for the production of flame retarding additives for polymer compositions (in particular polyolefins), by reacting particular nitrogenous organic compounds with $P_2O_5$ and water, and the additives thus obtained.

It is known that easily flammable polymers, among them the polyolefins, such as polypropylene, polyethylene, and polystyrene, can be rendered combustion-proof with the addition of organic additives that cause intumescence to form when they come in contact with a flame. Said intumescence consists of the formation of a layer of swollen noncombustible carbonaceous material that forms a barrier between the flame and the polymer, thus interrupting the combustion.

Typically the above mentioned organic additives comprise one or more nitrogenous compounds, preferably cyclic, containing primary or secondary amino groups, and one or more ammonium or amine phosphates, or one or more phosphates of the above mentioned nitrogenous organic compounds and optionally one or more ammonium or amine phosphates. With the general term "phosphates" reference is made to all types of salts that can be obtained from the phosphoric acids, such as the orthophosphates, the pyrophosphates, and the polyphosphates.

Specific examples of the above mentioned additives are described in U.S. Pat. Nos. 4,193,945, and 4,599,375.

Particularly effective are the flame retarding additives based on piperazine phosphates described in U.S. Pat. No. 4,599,375.

As shown in the examples of said patent, piperazine phosphates are normally prepared by reacting the piperazine with the corresponding phosphoric acid (such as orthophosphoric acid, for example), or with a corresponding inorganic salt under controlled pH.

The petitioner has now perfected a process for the preparation of flame retarding additives by reacting piperazine and/or other nitrogenous organic compounds, $P_2O_5$, and water.

An advantage of the process of the present invention consists of the fact that the additives obtained from it can be used directly in the preparation of flame-proof polymer compositions, without the need for any treatment, with the possible exception of a previous milling operation to obtained the desired particle size. Therefore, the advantageous simplification brought about by the process of the present invention compared with the ones known in the art is evident, since it only requires one synthesis stage using a low-cost phosphorus compound ($P_2O_5$), eliminating the previous stage for the preparation of the phosphoric acids or corresponding salts.

Moreover, the above mentioned process allows the single-stage preparation of flame retarding additives containing two or more nitrogenous organic compounds, such as piperazine and melamine for example.

It is believed that the additives thus obtained, which constitute an additional object of the present invention comprise one or more phosphates of the starting nitrogenous organic compounds.

A particularly surprising aspect of the present invention is represented by the fact that in addition to having a high flame retarding activity, the above mentioned additives have a very low solubility in water.

Therefore, it is believed, although this hypothesis obviously has no binding value, that the additives of the present invention comprise the polyphosphates of the starting nitrogenous organic compounds. It is a known fact that polyphosphates have low solubility. Obviously the low solubility of the additives of the present invention constitute a significant advantage, since it reduces the extraction and blooming of said additives from the polymer compositions that contain them when said compositions are exposed to humidity.

Therefore, one of the objects of the present invention is a process for the preparation of flame retarding additives comprising the reaction of:

A) one or more nitrogenous organic compounds selected from the group consisting of cyclic compounds ($A_1$) containing at least one >N—H group in the cyclic structure; compounds ($A_2$) of formula

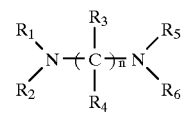

where n is a number from 2 to 12; the groups from $R_1$ to $R_6$, equal or different, are hydrogen, halogens, linear or branched $C_1$–$C_{20}$ alkyl, $C_3$–$C_{20}$ cycloalkyl, $C_6$–$C_{20}$ aryl, $C_7$–$C_{20}$ arylalkyl or alkylaryl groups, said alkyl, cycloalkyl, aryl, arylalkyl or alkylaryl groups being optionally substituted with halogens; compounds ($A_3$) of formula

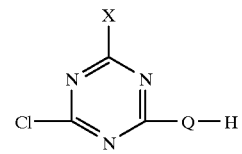

where Q is

—N—(CH$_2$)$_m$—N— where m is a number from 2 to 6, or a piperazinyl group of formula

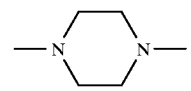

X is a heterocyclic group containing at least one nitrogen atom and bonded to the triazine ring by one of said nitrogen atoms;

compounds ($A_4$) of formula

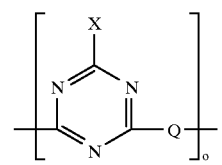

where o is a number from 2 to 50, preferably from 5 to 20, and the X and Q groups have the same meaning as described above for compounds ($A_3$); or a mixture ($A_5$) of one or more of the compounds from ($A_1$) to ($A_4$) with one or more additional compounds selected from the group consisting of melamine, dicyandiamide, acetoguanamine, or benzoguanamine, said additional compounds being present in quantities ranging from 2% to 70% by weight, preferably from 5% to 50% with respect to the total weight of the mixture ($A_5$);

B) $P_2O_5$;

C) $H_2O$;

said reaction components being used in (C)/(B) molar ratios ranging from 1 to 3, preferably from 1.5 to 2.5, and (A)/(B)+(C) molar ratios ranging from 0.1 to 1, preferably from 0.3 to 0.8.

Preferably the $R_1$, $R_2$, $R_5$, and $R_6$ groups in the formula of the ($A_2$) compounds are hydrogen.

Specific examples of compounds ($A_1$) are piperazine; morpholine, ethylene urea; thiourea; 1,4-bis(2-hydroxypropyl)piperazine; isocyanuric acid esters, in particular tris(2-hydroxyethyl)isocyanurate; piperazine-3,6-dione; hydantoin.

The halogens optionally present in compounds ($A_2$) are preferably Cl and Br.

Specific examples of compounds ($A_2$) are ethylenediamine; hexamethylenediamine; tetraethylenediamine.

The X group in the formula of compounds ($A_3$) is preferably morpholino.

A specific example of ($A_3$) compounds is the 2-chloro-4-morpholino-6-piperazinyltriazine.

The X group in the formula of compounds ($A_4$) is preferably morpholino, and the Q group is preferably the above mentioned piperazinyl group.

The quantity of water (component (C)) added to the reaction system is that which is needed for the reaction with (B) in order to form phosphates "in situ".

The water (component (C)) can be added in free form and/or as a hydrated compound.

In particular it can be added in one or more of the following forms:

as water as such (free form);

as hydration, in particular crystallization water of one or more nitrogenous organic compounds (component (A)), such as hydrated piperazine for example;

as water, in particular crystallization water, of hydrated salts, such as trisodium phosphate or borax.

The order and method used to add the reaction components can vary greatly, with the only precaution being that one must avoid excessive exothermic phenomena due to the reaction between components (B) and (C).

Preferably the reaction mass is maintained at a temperature below 100° C., indicatively greater than or equal to 20° C., in particular from 20° to 90° C., for the entire time that components (A), (B) and (C) are being fed in the reaction zone.

As reactor one can use known powder mixers, such as the ones equipped with ribbon agitators.

The reaction between components (A), (B) and (C) can occur in solid phase, liquid phase (in solution or molten mass), or in mixed liquid-solid phase.

The operation can also be carried out in consecutive steps, each of which can be carried out in a liquid, solid, or mixed solid-liquid phase.

When the reaction between components (A), (B) and (C) is substantially completed, i.e., when the reaction mass no longer generates any significant heat,, it is preferable to bring the reaction system to a temperature greater than or equal to 70° C. (from 100° to 180° C. for example).

Preferably the reaction system is maintained at said temperature for 30 minutes or more, indicatively up to 3 hours, such as from 2 to 3 hours for example.

A further advantage of the process of the invention is that during or after the above mentioned synthesis other powder additives can be added in order to improve the flame retarding properties of the composition, such as metallic oxides, for example, like $TiO_2$, ZnO, $SiO_2$, silicic acid, phosphates, inorganic sulfates and silicates, such as Na and K phosphates and sulfates, amine phosphates, such as melamine phosphate.

It is also possible to add other types of additives, such as oxidants, stabilizers, antacids, fillers, dehydrators (i.e. dehydrating agents, such as zeolites or dehydrated salts), and mixtures thereof.

In particular the addition of dehydrators, preferably at the end of the feeding of components (A), (B) and (C) in the reaction zone (i.e., when said feeding has been completed), also improves the flame retarding properties of the composition.

Preferably the dehydrators are added in quantities ranging from 1 to 20% by weight with respect to the total weight of the reaction mass.

Moreover, the process of the invention does not produce undesired byproducts or any type of effluent, either liquid or gaseous.

The polymers that can be used to prepare the polymer compositions containing the additives of the present invention are selected from polymers and copolymers, or their mixtures, obtained by mechanical mixing or sequential polymerization, of olefins of formula $R-CH=CH_2$, where R is a hydrogen atom, or an alkyl radical with 1-6 carbon atoms, or an aryl radical.

In particular, said polyolefins comprise:

1) isotactic or mostly isotactic polypropylene;
2) HDPE, LLDPE, and LDPE polyethylene;
3) crystalline copolymers of propylene with ethylene and/or other α-olefins, such as 1-butene, 1-hexene, 1-octene, and 4-methyl-pentene for example;
4) ethylene/α-olefin elastomeric copolymers, and ethylene/α-olefin/diene elastomeric terpolymers containing minor proportions of diene, where the α-olefin is preferably selected from propylene, 1-butene, 1-pentene, 1-hexene, 4-methyl-l-pentene, and 3-methyl-1-butene; (examples of dienes most commonly present in the above mentioned elastomeric terpolymers are butadiene, ethylene-norbornene, and 1,4-hexadiene);
5) heterophasic polymers obtained by mechanical mixing or sequential polymerization, comprising a fraction made up of a propylene homopolymer or the copolymers mentioned at point (3) and a copolymer fraction made up of the elastomeric copolymers and terpolymers of point (4);
6) polymers obtained from di-olefins or cycloolefins, such as for example polyisoprene and polybutadiene, polycyclopentene, polynorbornene;
7) polystyrene.

Other examples of polymers commonly used are polyamide resins, polyurethane (polyester and polyether), polyethylene terephthalate and polybutylene terephthalate, as well as ABS and SAN copolymers.

Indicatively, the flame retarding additives of the present invention, obtained with the above mentioned process, can be added to polymer compositions in quantities ranging from 5 to 50%, preferably from 15 to 35% by weight with respect to the total weight of the compositions.

The polymer compositions can also be prepared according to conventional methods, such as for example mixing the polymer with the other components in a dry mixer, and extruding the mixture by way of an extruder with a temperature that is most suitable to obtain a granular product.

The following examples are given in order to illustrate the present invention.

EXAMPLE 1

The following reaction components are used:
A) MELAMINE Kg. 28.98
B) PHOSPHORIC ANHYDRIDE ($P_2O_5$) Kg. 41.17
C) HYDRATED PIPERAZINE (35% by weight $H_2O$) Kg. 29.84

The operation takes place in a reactor comprising a stainless steel mixer with a double ribbon agitator and a jacket for the circulation of heating or cooling liquid.

To the powdered melamine, previously fed into the mixer (which is provided with a lid to prevent the loss of volatile products during the reaction), the powdered phosphoric anhydride is quickly added while stirring and in nitrogen flow to reduce to the minimum the absorption of humidity by said phosphoric anhydride.

The feeder door is then closed in order to obtain the best possible seal of the mixer.

The hydrated piperazine is previously fed (either all at once or in successive charges) in the liquid state (it melts at 45–55° C.) in a tank that can be heated up to 60° C. to maintain it liquid, from where it can be pumped and sprayed on to the reaction mass.

At this point the reaction is started by feeding the hydrated piperazine (atomized) on to the powder mixture that is being continuously stirred and kept under nitrogen flow.

In order to facilitate the reaction said addition is divided into 3 phases with the following reaction mass temperature ranges:
1st phase 25–40° C.
2nd phase 42–60° C.
3rd phase 65–80° C.
1st phase One third of the hydrated piperazine (9.95 Kg) is fed continuously by way of a wide distribution atomizing system keeping the spray from reaching the walls of the mixer as much as possible, in order to reduce the possible formation of encrustation. The feeding speed must be regulated in order to maintain the mass temperature between 25 and 40° C. A period of 30–60 minutes is sufficient for this operation.

At the end the reaction mass temperature is brought to 80° C. and maintained at this level for about 30 minutes in order to eliminate any accumulation of hydrated piperazine that did not react with the phosphoric anhydride, since this could cause sudden overheating during the succeeding phases. After this period the temperature is reduced to 42° C.
2nd phase At this point another third of hydrated piperazine (9.95 Kg) is added following the same method described above, but maintaining the temperature between 42 and 60° C.

Then the temperature is increased to 90–95° C. and maintained at this level for 30–40 minutes, after which it is reduced to 65° C. before starting the third phase.
3rd phase The remaining hydrated piperazine (9.95 Kg) is then added following the same method described above except that the temperature is maintained in the 65–80° C. range. At the end of the addition the temperature is gradually increased to the maximum values allowed by the available heating system (up to 150–160° C.) and maintained at that level for 3 hours.

The mass is then cooled and discharged in order to be subjected to a fine milling process.

EXAMPLE 2

In the mixer described above one feeds about half (11 Kg) of the powdered melamine, 3.1 Kg of piperazine, and 45.6 Kg of powdered $P_2O_5$ under nitrogen flow. The mixer is then closed and the content is kept under stirring for 15 minutes in order to homogenize the mixture. The reaction is then started by feeding the hydrated piperazine (30 Kg) and the remaining melamine (11.3 Kg), previously mixed, to the powder mixture that is being continually stirred and kept under nitrogen flow. The feeding takes place in about 3 hours, making sure that the reaction mass temperature does not exceed 90° C.

After the feeding is completed the reaction mass is maintained under agitation at 80–90° C. for about 30 minutes, after which the temperature is increased to 150–160° C. and maintained at that level for 2 hours. The mass is then cooled and discharged.

EXAMPLE 3

Example 2 is repeated, with the difference that after the feeding of the hydrated piperazine and the remaining melamine is completed, one adds 7% by weight, with respect to the total weight of the reaction mass, of anhydrous trisodium phosphate.

EXAMPLE 4

Example 2 is repeated, with the difference that after the feeding of the hydrated piperazine and the remaining melamine is completed, one adds 7% by weight, with respect to the total weight of the reaction mass, of dehydrating zeolite.

Flame resistance tests

A quantity of 26% by weight of each of the products obtained in the preceding examples is mixed, in a twin-screw extruder, with polypropylene homopolymer Moplen F30G (marketed by Montell Italia S.p.A.) having a Melt Flow Rate (according to ASTM D 1238 L) of 12 g/10 min., and the granules thus obtained are used to mold some plaques using a press at 230° C.

On said plaques the level of flame resistance is determined, both by measuring the Oxygen Index (L.O.I. according to ASTM-D2863) which expresses the minimum percentage of oxygen needed in the mixture with nitrogen in order for the sample to burn continuously, and by applying UL-94 regulations (issued by Underwriters Laboratories - USA) that give an evaluation of the extinguishing degree of the plastic materials. The "Vertical Burning Test" was used in the application of said regulations, which allows the classification of the material at the 94 V-0, 94 V-1, and 94 V-2 levels depending on the time of combustion of the samples and whether or not they drop flaming particles. Said method involves the ignition of the sample, placed in a vertical position, by placing the flame near the lower extremity and making two ignition attempts, each attempt lasting about 10 seconds.

The results are reported in Table 1 below, listing for each specimen the example relating to the preparation of the flame retarding additive it contains.

TABLE 1

|       | Ex. 1 | Ex. 2 | Ex. 3 | Ex. 4 |
|-------|-------|-------|-------|-------|
| L.O.I. | 32   | 34.2  | 36.4  | 39.7  |
| UL 94* | V-0  | V-0   | V-0   | V-0   |

*sample thickness: 3.2 mm.

We claim:
1. Process for the preparation of flame retarding additives, comprising the reaction of:
A) one or more nitrogenous organic compounds selected from the group consisting of cyclic compounds ($A_1$)

containing at least one >N—H group in the cyclic structure; compounds (A$_2$) of the formula

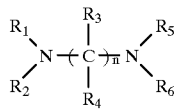

where n is a number from 2 to 12; the groups from R$_1$ to R$_6$, equal or different, are hydrogen, halogens, linear or branched C$_1$–C$_{20}$ alkyl, C$_3$–C$_{20}$ cycloalkyl, C$_6$–C$_{20}$ aryl, C$_7$–C$_{20}$ arylalkyl or alkylaryl groups, said alkyl, cycloalkyl, aryl, arylalkyl or alkylaryl groups being optionally substituted with halogens; compounds (A$_3$) for formula

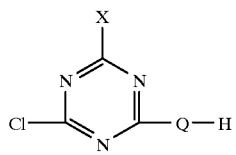

where Q is

where m is a number from 2 to 6, or a piperazinyl group of formula

X is a heterocyclic group containing at least one nitrogen atom and bonded to the triazine ring by one of said nitrogen atoms;
compounds (A$_4$) of formula

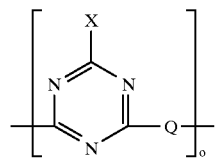

where o is a number from 2 to 50, and the X and Q groups have the same meaning as described above for compounds (A$_3$); and a mixture (A$_5$) of one or more of the compounds from (A$_1$) to (A$_4$) with one or more additional compounds selected from the group consisting of melamine, dicyandiamide, acetoguanamine and benzoguanamine, said additional compounds being present in quantities ranging from 2% to 70% by weight with respect to the total weight of the mixture (A$_5$);
B) P$_2$O$_5$;
C) H$_2$O;
said reaction components being used in (C)/(B) molar ratios ranging from 1 to 3, and (A)/(B)+(C) molar ratios ranging from 0.1 to 1, wherein said reaction is completed in a single stage.

2. The process of claim 1, where the water (component (C)) is added as hydration water of one or more nitrogenous compounds (component (A)).

3. The process of claim 2, where the water is added in the form of hydrated piperazine.

4. The process of claim 1, where when the reaction between components (A), (B) and (C) is substantially completed, the reaction system is brought to a temperature greater than or equal to 70° C.

5. The process of claim 1, where a dehydrator is added in the reaction zone after the feeding of components (A), (B) and (C) has been completed.

6. A flame retarding additive obtained with the process of claim 1.

7. Polymer compositions containing effective quantities of flame retarding additives obtained with the process of claim 1.

8. Process for the preparation of flame retarding additives, comprising the reaction of:

A) one or more nitrogenous organic compounds selected from the group consisting of cyclic compounds (A$_1$) containing at least one >N—H group in the cyclic structure; compounds (A$_2$) of the formula

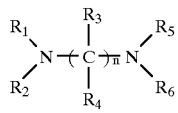

where n is a number from 2 to 12; the groups from R$_1$ to R$_6$, equal or different, are hydrogen, halogens, linear or branched C$_1$–C$_{20}$ alkyl, C$_3$–C$_{20}$ cycloalkyl, C$_6$–C$_{20}$ aryl, C$_7$–C$_{20}$ arylalkyl or alkylaryl groups, said alkyl, cycloalkyl, aryl, arylalkyl or alkylaryl groups being optionally substituted with halogens;
compounds (A$_3$) for formula

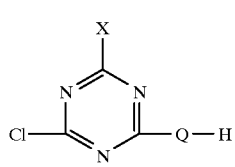

where Q is

where m is a number from 2 to 6, or a piperazinyl group of formula

X is a heterocyclic group containing at least one nitrogen atom and bonded to the triazine ring by one of said nitrogen atoms;

compounds ($A_4$) of formula

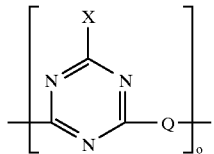

where o is a number from 2 to 50, and the X and Q groups have the same meaning as described above for compounds ($A_3$); and a mixture ($A_5$) of one or more of the compounds from ($A_1$) to ($A_1$) with one or more additional compounds selected from the group consisting of melamine, dicyandiamide, acetoguanamine and benzoguanamine, said additional compounds being present in quantities ranging from 2% to 70% by weight with respect to the total weight of the mixture ($A_5$);

B) $P_2O_5$;

C) $H_2O$;

said reaction components being used in (C)/(B) molar ratios ranging from 1 to 3, and (A)/(B)+(C) molar ratios ranging from 0.1 to 1, where the reaction mass is maintained at a temperature lower than 100° C. for the entire time that components (A), (B) and (C) are fed into the reaction zone, and wherein said reaction is completed in a single stage.

* * * * *

UNITED STATES PATENT AND TRADEMARK OFFICE
CERTIFICATE OF CORRECTION

PATENT NO. : 5,948,837
DATED : September 7, 1999
INVENTOR(S) : Osvaldo Cicchetti et al It is certified that error appears in the above-indentified patent and that said Letters Patent is hereby corrected as shown below:

At col. 9, line 17, change second occurrence of "$(A_1)$" to --$(A_4)$--.

Signed and Sealed this

Fourth Day of April, 2000

Attest:

Attesting Officer

Q. TODD DICKINSON

Director of Patents and Trademarks